(12) United States Patent
Friesen et al.

(10) Patent No.: US 12,130,614 B2
(45) Date of Patent: Oct. 29, 2024

(54) FIELD DEVICE ENERGY MANAGEMENT UNIT

(71) Applicant: Siemens Aktiengesellschaft, Munich (DE)

(72) Inventors: Slava Friesen, Rülzheim (DE); Robin Pramanik, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 371 days.

(21) Appl. No.: 17/708,559

(22) Filed: Mar. 30, 2022

(65) Prior Publication Data

US 2022/0317666 A1    Oct. 6, 2022

(30) Foreign Application Priority Data

Mar. 31, 2021    (DE) .............................. 102021203275

(51) Int. Cl.
    *G05B 19/418*    (2006.01)
(52) U.S. Cl.
    CPC .............. *G05B 19/4188* (2013.01)
(58) Field of Classification Search
    None
    See application file for complete search history.

(56) References Cited

U.S. PATENT DOCUMENTS

| 10,579,558 | B1* | 3/2020 | Sundaresh | ............. | H01R 43/26 |
| 2001/0035735 | A1 | 11/2001 | Fukuoka et al. | | |
| 2002/0101748 | A1* | 8/2002 | Loechner | ................ | H02J 7/345 |
| | | | | | 363/84 |
| 2016/0006261 | A1* | 1/2016 | Pilz | .......................... | H04B 5/24 |
| | | | | | 307/104 |
| 2016/0025792 | A1* | 1/2016 | Oestreicher | ............ | G05B 23/00 |
| | | | | | 324/538 |
| 2018/0253072 | A1 | 9/2018 | Seiler et al. | | |

FOREIGN PATENT DOCUMENTS

| DE | 102012110674 | 5/2014 |
| DE | 102015115275 | 3/2017 |
| EP | 3637676 | 4/2020 |

OTHER PUBLICATIONS

Examination Report dated Nov. 19, 2021 based on DE102021203275.3 filed Mar. 31, 2021.

* cited by examiner

*Primary Examiner* — Jared Fureman
*Assistant Examiner* — Joel Barnett
(74) *Attorney, Agent, or Firm* — Cozen O'Connor

(57) ABSTRACT

A field device energy management unit for a field device with an energy store for temporarily storing energy for a load of the field device includes a first current path connected or connectable to the energy store on the input side and in which a first diode is arranged on the output side, at least one second current path connected or connectable to a voltage supply of the field device on the input side, and in which a second diode is arranged on the output side, where the first and the second diode are operable such that, when the energy consumption of the load is low, the first diode is connected in the reverse direction and the second diode is connected in the forward direction and, when the energy consumption of the load is high, the first diode is connected in the forward direction.

19 Claims, 2 Drawing Sheets

FIELD DEVICE ENERGY MANAGEMENT UNIT

BACKGROUND OF THE INVENTION

1. Field of the Invention

The invention relates to a field device energy management unit for a field device, a field device with such a unit, a function module for a field device with such a unit and a method for operating the field device energy management unit.

2. Description of the Related Art

In industrial process automation technology, the devices used are frequently arranged in a decentralized manner in the field, i.e. in the vicinity of a process to be monitored or controlled and thus outside a control room for controlling the process. Such devices are referred to as field devices. For example, they provide information on the process (for example, measured values for temperature, pressure, flow rate) and/or influence the process (for example, regulate valve settings). Field devices that provide information on a process are frequently also referred to as sensors or measuring transducers. Field devices that influence a process are frequently also referred to as actuators or controlling elements.

Field devices are often also not arranged in protective control cabinets, but are directly exposed to the harsh ambient conditions and also the safety requirements of the process. As a result, high requirements are placed on field devices in terms of quality, robustness and availability. They often have to be usable for large temperature ranges and meet requirements for intrinsic safety and explosion protection.

"Smart" or intelligent field devices with extensive communication, diagnostic, configuration and parametrization options and data processing functions are also increasingly being used.

Field devices are usually connected to the lowest level of an industrial communication network, for example, to a fieldbus, which they can use to provide process information to higher-level mechanisms, such as control and/or regulating mechanisms or monitoring and diagnostic mechanisms for the process or to receive manipulated variables thereby. Smart field devices can also provide information about themselves (operating status, configuration, SW version, firmware version) to higher-level process device management systems. Examples of communication mechanisms used for this purpose are HART, PROFIBUS, CAN or Ethernet-based mechanisms: PROFINET, Ethernet IP, MODBUS TCP, TSN or Single-Pair Ethernet.

Field devices in the broader sense also generally include all other devices arranged in the vicinity of the process and are connected to a communication system, such as to a fieldbus. Examples of this are remote I/Os that connect analog or binary sensors or actuators to the communication system, or also gateways or linking devices.

One particular challenge for many field devices is that (in particular due to safety requirements such as explosion protection) the supply of electrical energy for their operation is restricted. In this case, in order to save wiring, the energy supply and communication often occur via a common conductor system. For example, "two-conductor" technology (also called two-wire technology) is used, where the transmission of communication signals and the provision of current for the energy supply of the field device occurs via a common pair of leads. Here, a first wire or a first lead is used for the outward path and a second wire or a second lead is used for the return path. One example of this is a two-conductor loop downstream of the 4 to 20 mA standard. Communication in accordance with the four-conductor technique can also be used.

Power over Ethernet (PoE) and Single Pair Ethernet (SPE) in which network-capable devices are also supplied with electrical energy via an Ethernet cable are also increasingly being used. The future will see the use of Ethernet Advanced Physical Layer (APL) in which communication and energy supply occur via a single 2-core cable; this is particularly suitable for the special requirements of process manufacturing.

Therefore, in field devices to which a limited amount of energy can be supplied, it is necessary to utilize the available energy balance as optimally as possible. Especially in the case of 4 to 20 mA field devices, every microwatt counts. Moreover, in many applications, energy distribution is not only static, but also dynamic. Often, for a short time, more energy is required than the field device can provide at that particular moment. For such cases, the energy is accumulated and stored temporarily in an energy store (for example, in capacitors, accumulators).

DE 10 2015 115 275 A1, for example, discloses a field device for radar-based fill level measurement with a sensor module for fill level measurement and a communication module. For the measuring function, the sensor module requires more energy than can be supplied to the field device via a two-conductor bus. Therefore, a storage capacitor that is charged from the two-conductor bus between the measuring phases is assigned to the sensor module. A measurement is only performed if the state of charge of the storage capacitor is within a specified range. Likewise, a communication module could be provided that requires more energy to transmit/receive than is permanently and continuously available. To measure the state of charge of the storage capacitor, the voltage across the storage capacitor is measured.

Basically, no more energy may be withdrawn from the system of the field device than is available so that the other loads of the systems can continue to function. Nevertheless, a load that requires more energy for a short time has to be supplied with less energy during the rest of the time (for example, sleep mode in the case of a microcontroller).

In addition, only a very limited additional amount of energy is available (for example, 100 µW) for expanding the functions of the field device, for example, by a radio module or a display, without the other functions of the field device being impaired. An unfavorable degree of efficiency in the conversion and storage of the energy in an energy store reduces the available energy even further so that many functional expansions cannot be implemented. Often, only a new development of the field device is possible to enable more energy to be available for the functional expansion.

In order, for example, to make accumulation and temporary storage of energy as efficient as possible, a system supply voltage of the field device is stepped up with the aid of a step-up converter in order to then store the charge on a capacitor, since the energy in the capacitor is quadratic to the voltage.

However, over the entire charging time of the energy storage device, a specific limit value must not be exceeded when current is withdrawn from the system of the field device. Therefore, the process must be constantly monitored and controlled by current feedback (for example by means of an analog-to-digital converter).

In order to be able to use stored energy, the voltage can then be stepped down again with the aid of a step-down converter in order to adapt it to the operating voltage of the module to be supplied. Depending upon when and how much energy is required, the energy from the energy store is switched on or off for the load via switches and associated actuation logic. For this purpose, it is necessary for the voltage value at the energy store to be measured or determined via a comparator.

Hence, the control and monitoring of the accumulation and temporary storage of the energy and the switching operations for energy distribution, i.e., energy management of the field device, require a plurality of electronic components and high overheads for evaluation and control logic. In addition, the components required for this need space and energy.

SUMMARY OF THE INVENTION

In view of the foregoing, it is therefore an object of the present invention to enable energy management in a field device with an energy store which has lower overheads and, above all, is more energy-efficient.

This and other objects and advantages are achieved in accordance with a field device energy management unit, a field device with such a unit, a function module for a field device with such a unit and a method for operating such a field device energy management unit, where the field device energy management unit for the field device with an energy store for temporarily storing energy for a load of the field device comprises a first current path, which can be or is connected to the energy store on the input side and in which a first diode is arranged on the output side, the cathode of which can be or is connected to the load of the field device. The field device energy management unit also includes at least one second current path, which can be or is connected to a voltage supply of the field device on the input side, and in which a second diode is arranged on the output side, the cathode of which can be or is connected to the load of the field device, where the first and the second diode are operable such that, when the energy consumption of the load is low, the first diode is connected in the reverse direction and the second diode is connected in the forward direction and, when the energy consumption of the load is high, the first diode is connected in the forward direction.

Hence, at least two diode-decoupled current paths are available for supplying energy to the load. Depending on the state of charge of the energy store and the operating state of the load, dynamic current conduction and energy withdrawal can occur automatically via the two current paths and selective operation of the diodes in the forward or reverse direction such that low energy consumption of the load, which can still be provided from the voltage supply of the field device, is covered directly from the voltage supply via the second current path. This energy is not required to take a lossy route via the energy store and possibly the associated step-up/step-down converters. As a result, the energy can be provided to the load in a very energy-efficient manner. On the other hand, high energy consumption by the load, which can no longer be covered from the voltage supply of the field device, is automatically only or additionally covered via the first current path from the energy store.

In this case, selective operation of the two diodes in the forward or reverse direction can be easily achieved by setting the voltage ratios (i.e., voltage drop) across the diodes accordingly. These result from the differences in the voltage potentials of the respective anodes and cathodes. The voltage potential of the anode of the first diode is substantially influenced by the voltage of the energy store and hence by its state of charge. The voltage potential of the anode of the second diode is substantially influenced by the voltage of the voltage source.

The voltage potential at both cathodes is equal to that at the input of the load and is determined by the voltage drop at the load. Hence, the voltage potential at the cathodes is high when the load has only low energy consumption. On the other hand, the voltage potential is low when the load has high power consumption and its input voltage collapses as a result.

Hence, due to the "automatic" switching of the energy distribution or current conduction through the diodes based on the voltage ratios there, no voltage measurement at the energy store and also no switches with corresponding actuation logic are necessary for switching the energy distribution between the voltage supply, energy store and load.

Here, the term "load" refers to an electrical load. In this case, the load can also be a plurality of loads which, however, effectively act as a single load from the point of view of the energy management unit. In this case, there may also be one or more further second current paths, which can be or are connected to a further voltage supply of the field device on the input side, and in each of which a diode is arranged on the output side, the cathode of which can be or is connected to the load of the field device. For example, a further current path can be connected or connectable to a voltage supply of the field device on the input side in the form of a backup battery. In this way, an emergency supply can still be provided for the load in the event of failure of an externally supplied regular voltage supply and a simultaneously discharged energy store.

The energy store can, for example, be a capacitor, a SuperCap, an accumulator or a battery.

The diodes can, for example, be a conventional semiconductor element or an electronic circuit with diode behavior.

To charge the energy store with current from the voltage supply, advantageously a third current path is present, which can be or is connected to the voltage supply of the field device on the input side and that can be or is connected to the energy store on the output side.

To limit the energy withdrawal of the second current path from the voltage supply or from the field device, advantageously a first current-limiting element is arranged in the second current path.

To limit the energy withdrawal of the third current path from the voltage supply or from the field device, advantageously a second current-limiting element is arranged in the third current path.

The use of such current-limiting elements makes it possible to dispense with measurement and monitoring of the current withdrawn from the voltage source and a switch for the interruption thereof in the event of a limit value being exceeded.

In accordance with a particularly advantageous embodiment, the current-limiting element or current-limiting elements is/are formed as a current source. A current source should be understood to be an active circuit element capable of providing a substantially constant current flow to a circuit regardless of the voltage developed across its terminals. Current sources can, for example, be constructed using bipolar transistors, field effect transistors or operational amplifiers.

In accordance with a further advantageous embodiment, a step-up converter is arranged in the third current path. This enables the voltage of the voltage source to be stepped up in order to be able to store more energy in the energy store.

In order to transform a voltage of the energy store to a value suitable for the load, a converter can be arranged in the first current path between the energy store and the diode. This can be a step-down converter. It is also possible to use a buck/boost converter, which, depending on the state of charge of the capacitor, either reduces (step-down/buck behavior) or raises (boost/step-up behavior) the voltage. Such a buck/boost converter is particularly advantageous if the energy store is charged directly from the voltage supply.

Preferably, a fourth current path is additionally present that connects the second and the third current path to one another. If the load does not fully require the current available via the second current path, then the excess can be diverted via the fourth current path into the third current path and hence for energy storage.

Advantageously, the fourth current path is connected to the second current path on the input side downstream of the first current-limiting element and to the third first current path on the output side downstream of the second current-limiting element. This is a simple way of also limiting current withdrawal from the voltage supply for this energy diversion.

In order to prevent an undesired current flow from the third current path to the second current path, advantageously a third diode is arranged in the fourth current path, the anode of which is connected to the second current path and the cathode of which is connected to the third current path.

In accordance with a particularly advantageous embodiment, the energy store is configured to temporarily store energy for an energy requirement of the load that is greater than an amount of energy that can be made available by the voltage supply, in particular greater than an amount of energy that can be made available externally to the field device.

The load can advantageously be a communication module (in particular a radio module), a display, a sensor module, a measurement data processing module, a control module or a regulation module.

A communication module can, for example, be used to transmit measured values to a higher-level mechanism and/or to receive setpoint values from such a mechanism. The communication can be wired or wireless. A radio module can, for example, operate in accordance with the WirelessHART, Bluetooth Low Energy, 3G, 4G or 5G standard.

A display can be used for the parameterization, configuration and diagnosis of a field device.

A sensor module can be used to detect physical process variables, such as temperature, pressure, flow rate, vibrations, and/or fill level.

A measurement data processing module can be used for on-site analysis of measurement data. For example, statistical evaluations, KPI determinations and classifications of the measurement data in accordance with EN 10816-6, -7, -3 can be performed. Machine learning can be used to detect anomalies in measurement data and generate forecasts for the future course of measurement data.

A control module can be used to output setpoint values for setting manipulated variables of a process (for example, a valve setting). A regulation module is used accordingly to output setpoint values for regulating process variables.

A field device in accordance with the invention with an energy store for temporarily storing energy for a load of the field device, in particular for temporarily storing energy for an energy requirement of the load that is greater than an amount of energy that can be made available by the field device, comprises an energy management unit as described above.

A function module in accordance with the invention for a field device comprises a load, an energy store for temporarily storing energy for the load, in particular for temporarily storing energy for an energy requirement of the load that is greater than an amount of energy that can be made available to the function module by the field device and an energy management unit as described above.

Hence, the energy management unit is integrated into the module together with the energy store and the load.

The function module is preferably formed as a communication module (in particular a radio module), a display, a sensor module, a measurement data processing module, a control module or a regulation module. It is preferably a module that can be retrofitted to a field device. Advantageously, the function module can be detachably attached to a field device.

In a method in accordance with the invention for operating a field device energy management unit as described above, the first and the second diode are operated such that, when energy consumption is low, the load is only supplied with energy via the second current path and, when energy consumption is high, is only or additionally supplied with energy via the first current path.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantageous embodiments of the invention according to features of the subclaims are explained in more detail below with reference to exemplary embodiments in the figures, in which:

DETAILED DESCRIPTION OF THE EXEMPLARY EMBODIMENTS

For purposes of simplification, a single-conductor representation has been selected in each of the figures. In reality, it should be understood, at least two conductors are present in each case (forward conductor and return conductor).

Figure 1:
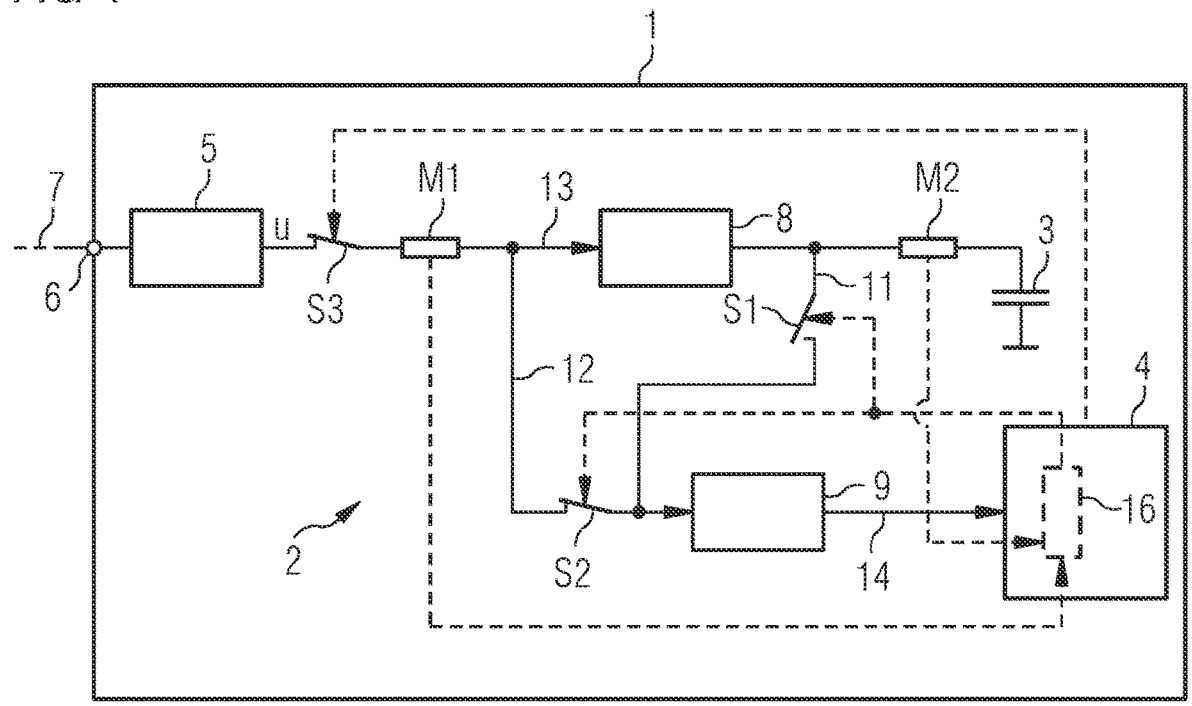
FIG. 1 is a schematic block diagram of a field device with an energy management unit in accordance with the prior art.

FIG. 1 is a simplified schematic representation of a field device 1 with an energy management unit 2 in accordance with the prior art. The field device 1 comprises an energy store in the form of a capacitor 3, a load 4, a voltage supply 5, a step-up converter 8 and a step-down converter 9.

The voltage supply 5 provides an output voltage U and is supplied with energy externally via an energy supply terminal 6 of the field device. For example, a two-wire loop 7 with a 4 to 20 mA current interface with joint transmission of energy and communication can be connected to the energy supply terminal 6.

The load 4 can be an "intelligent" load with, for example, its own facilities for communicating with other components of the field device, its own controller (e.g., a microcontroller), its own data processing capabilities, configuration or parameterization facilities, etc.

The load 4 has at least two operating modes: a first operating mode with low energy consumption and a second operating mode with high energy consumption. In a sensor module, for example, the first operating mode can be a sleep mode and the second operating mode can be the actual measurement activity. In a radio module, for example, the first operating mode can be a sleep mode and the second operating mode can be the actual transmitting and receiving activity.

The capacitor 3 is used to temporarily store energy for a (temporary) energy requirement of the load 4 in the second operating mode if this is greater than an amount of energy that can be supplied by the voltage supply 5. Alternatively, it can also be an accumulator. It is also possible to use a SuperCap.

A capacitor 3 of this kind is frequently also referred to as a buffer capacitor and is to be distinguished from a filter or smoothing capacitor.

For energy management, the field device 1 comprises a first current path 11, a second current path 12, a third current path 13 and a fourth current path 14.

The first current path 11 is connected on the input side to the capacitor 3 and on the output side to an input of the step-down converter 9. A switch S1 is arranged in the first current path 11.

The second current path 12 is connected on the input side to the voltage supply 5 and on the output side to the input of the step-down converter 9. A switch S2 is arranged in the second current path 12.

The third current path 13 is connected on the input side to the voltage supply 5 and on the output side to the capacitor 5. The step-up converter 8 is arranged in the third current path 12.

The first current path 11 is used to supply the load 4 with energy from the capacitor 3 when the load 4 has a high energy requirement. The second current path 12 is used to supply the load 4 directly with energy from the voltage supply 5 if the load 4 has a low energy requirement. The third current path 13 is used to charge the capacitor 3 with energy from the voltage supply 5.

In order to make accumulation and temporary storage of energy as efficient as possible, the output voltage U of the voltage supply 5 is stepped up via the third current path 13 with the aid of the step-up converter 8 in order then to store the charge on the capacitor 3 since the energy in the capacitor 3 is quadratic to the voltage.

In order to be able to use the energy stored in the capacitor 3, the voltage is then stepped down again via the first current path with the aid of the step-down converter 9 in order to adapt it to the operating voltage of the load 4 to be supplied.

It is also possible to dispense with the step-up converter 8 and instead to charge the capacitor 3 directly from the voltage supply 5. In order then to convert a voltage of the capacitor 3 to a value suitable for the load 4, it is also possible for a buck/boost converter to be arranged in the first current path 21 between the capacitor 3 and the diode D1 which, depending upon the state of charge of the capacitor 3, either reduces (step-down/buck behavior) or raises (boost/step-up behavior) the voltage.

However, over the entire charging time of the capacitor 3, a specific limit value must not be exceeded when current is withdrawn from the voltage supply 5. Therefore, the process must be constantly monitored by current monitoring (for example, via a measuring resistor M1 and a monitoring and control mechanism 16 integrated in the load 4) and, if the limit value is exceeded, the withdrawal of the current must be interrupted in that the monitoring and control mechanism 16 opens the switch S1.

Depending upon when and how much energy is required by the load 4, the monitoring and control mechanism 16 supplies energy to the load via the switches S1 and S2 either via the first current path 11 (switch S1 closed, switch S2 open) or the second current path (switch S1 open, switch S2 closed). For this purpose, the monitoring and control mechanism 16 measures a voltage value at the capacitor 3 via a measuring resistor M2.

Hence, the control and monitoring of the accumulation and temporary storage of the energy and the switching operations for energy distribution, i.e., for energy management of the field device, require a plurality of electronic components and overheads for evaluation and control logic. In addition, the components required for this need space and energy.

Figure 2:
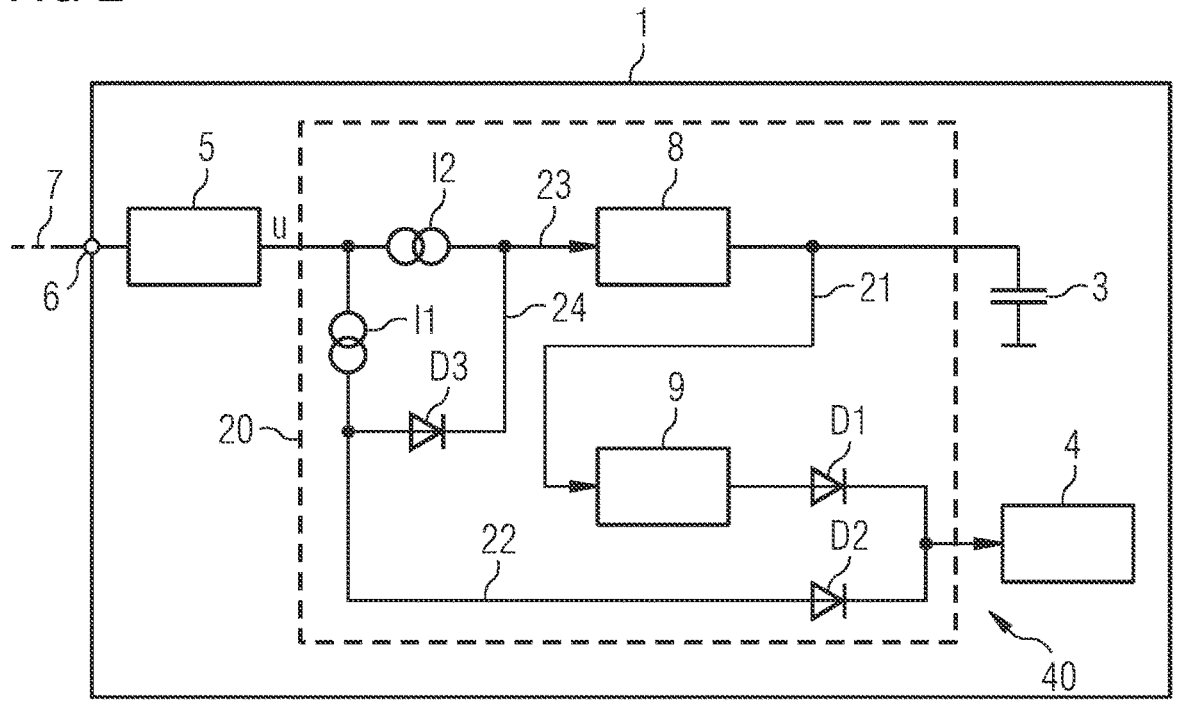
FIG. 2 is a schematic block diagram of a first exemplary embodiment of a field device with an energy management unit in accordance with the invention.

In contrast, FIG. 2 shows a first exemplary embodiment of a field device with an energy management unit 20 in accordance with the invention, where the elements that are the same as in FIG. 1 have also been provided with the same reference symbols.

The field device energy management unit comprises a first current path 21, a second current path 22, a third current path 23 and a fourth current path 24.

The first current path 21 can be or is connected to the capacitor 3 on the input side and a first diode D1 is arranged therein on the output side, the cathode of which can be or is connected to the load 4. The first current path 21 is used to supply the load 4 with energy from the capacitor 3.

The second current path 22 can be or is connected to the voltage supply 5 of the field device 1 on the input side and a second diode D2 is arranged therein on the output side, the cathode of which can be or is connected to the load 4. The second current path 22 is used to supply the load 4 with energy directly from the voltage supply 5.

The third current path 23 can be or is connected to the voltage supply 5 of the field device on the input side and can be or is connected to the capacitor 3 on the output side. The third current path 23 is used to charge the capacitor 3 with current from the voltage supply 5.

To limit the energy withdrawal of the second current path 22 from the voltage supply 5 or from the field device 1, a first current-limiting element in the form of a current source 11 is arranged in the second current path 22.

To limit the energy withdrawal of the third current path 23 from the voltage supply 5 or from the field device 1, a second current-limiting element in the form of a current source 12 is arranged in the third current path 23.

The current sources 11, 12 are active circuit elements capable of supplying a substantially constant current flow regardless of the voltage developed across their terminals. The current sources can, for example, be constructed using bipolar transistors, field effect transistors or operational amplifiers.

A step-up converter 8 is arranged in the third current path 23. This enables the voltage of the voltage source 5 to be stepped up in order to store more energy in the capacitor 3.

In the first current path 21, a step-down converter 9 is arranged between the capacitor 3 and the diode D1. This enables the voltage of the capacitor to be stepped down to a value suitable for the operation of the diode D1 and the load 4. In this case, the first diode D1 and the second diode D2 are operable in such that, when the energy consumption of the load 4 is low, the first diode D1 is connected in the reverse direction and the second diode D2 is connected in the forward direction and, when the energy consumption of the load 4 is high, the first diode D1 is connected in the forward direction.

Hence, two current paths 21, 22, decoupled by the diodes D1, D2, are available for supplying energy to the load 4. Depending on the state of charge of the capacitor 3 and the operating state of the load 4, dynamic current conduction and energy withdrawal can occur automatically via the two current paths 21, 22 and selective operation of the diodes in the forward or reverse direction such that low energy consumption of the load 4, which can still be provided from the voltage supply 5 of the field device, is covered directly from the voltage supply 5 via the second current path 21. This energy is not required to take a lossy route via the capacitor 3 and the converters 8, 9. As a result, the energy can be provided to the load 4 in a very energy-efficient manner. On the other hand, high energy consumption by the load 4, which can no longer be covered from the voltage supply 5, is automatically only or additionally covered via the first current path 21 from the capacitor 3.

Consequently, the first diode D1 and the second diode D2 are operated in a manner such that, when energy consumption is low, the load 4 is only supplied with energy via the second current path 22 and, when energy consumption is high, is only or additionally supplied with energy via the first current path 21.

In this case, selective operation of the two diodes D1, D2 in the forward or reverse direction can be easily achieved by setting the voltage ratios (i.e., voltage drop) across the diodes D1, D2 accordingly. These result from the differences in the voltage potentials of the respective anodes and cathodes. The voltage potential of the anode of the first diode D1 is substantially influenced by the voltage of the capacitor 3 (adapted by the step-down converter 9) and hence by its state of charge. The voltage potential of the anode of the second diode D2 is substantially influenced by the voltage U of the voltage supply.

The voltage potential at both cathodes is equal to that at the input of the load 4 and is determined by the voltage drop at the load 4. Hence, the voltage potential at the cathodes is high when the load only has a low energy consumption. On the other hand, the voltage potential is low when the load has high power consumption and its input voltage collapses as a result.

For example, the voltage supply 5 provides an output voltage U of 2 to 3 V. The voltage at the anode of the diode D1 is set to a voltage potential of 1.8 V. When the energy consumption of the load 4 is very low, only a very small current flows into the load 4. As a result, the voltage at the input of the load 4 is set to approximately the voltage of the voltage supply 5, i.e. 2 to 3 V. Here, the diode D2 is operated in the forward direction and, as a result, the diode D1 is operated in the reverse direction. Hence, the energy supply of the load 4 occurs exclusively via the second current path 22 from the voltage supply 5.

When the load 4 changes to high energy consumption, the voltage at the cathode of the diode D2 or at the input of the load 4 collapses because the current source 11 cannot now supply sufficient current. As a result, the voltage potential at the input of the load 4 or at the cathodes of the diodes D1, D2 falls below 1.8 V and the diode D1 is now operated in the forward direction. The energy supply of the load 4 now automatically additionally occurs via the first current path 21 from the capacitor 3. As soon as the energy consumption of the load 4 again drops to such a low value that the voltage potential of 1.8 V at the input of the load 4 or at the cathodes of the diodes D1, D2 is exceeded, the diode D1 is operated in the reverse direction again and hence the energy supply to the load 4 via the first current path 21 is automatically switched off and hence the load 4 is exclusively supplied with energy via the second current path 22.

Hence, due to the "automatic" switching of the energy distribution or current conduction by the diodes D1, D2 in dependence on the voltage ratios there, no voltage measurement at the capacitor and also no switches with corresponding actuation logic are necessary for switching the energy distribution between the voltage supply 5, capacitor 3 and load 4.

If required, a converter (e.g., a step-down converter) can also be arranged in the second current path 22 for adapting the voltage U of the voltage supply to the load 4 and for setting the voltage ratios at the diodes D1, D2.

The use of the current sources 11, 12 makes it possible to dispense with measurement and monitoring of the current withdrawn from the voltage supply 5 and a switch for the interruption thereof in the event of a limit being exceeded.

The fourth current path 24 connects the second current path 22 and the third current path 23 to one another. For this purpose, the fourth current path 24 is connected to the second current path 22 on the input side downstream of the first current source 11 and to the third current path 23 on the output side downstream of the second current source 12. If the load 3 does not fully require the current available via the second current path 22, then the excess can be diverted via the fourth current path 24 into the third current path 23 and hence for the energy storage in the capacitor 3. To prevent an undesired current flow from the third current path 23 to the second current path 22, a third diode D3 is arranged in the fourth current path 24, the anode of which is connected to the second current path 22 and the cathode of which is connected to the third current path 23.

The load 4 can, for example, be a sensor module, a communication module for transmitting measured values and diagnostic information to a higher-level mechanism and/or for receiving setpoint values and parameter values from the higher-level mechanism (in particular a radio module for wireless transmission of these values and information), a display, a measurement data processing module, a control module or a regulation module. Hence, the load 4 can be an "intelligent" load with, for example, its own facilities for communicating with other components of the field device, its own control (e.g., a microcontroller), its own data processing capabilities, configuration or parameterization facilities, etc.

Instead of only one single (electrical) load 4, there can also be a plurality of (electrical) loads which, however, effectively act as a single load from the point of view of the energy management unit. In this case, all the components 3, 4, 5, 8, 9, D1, D2, D3, I1, I2 can be enclosed by a housing of the field device 1.

However, it is also possible for one or some of the components to be arranged outside the housing or to be located remotely from other components during operation and connected to one another via cables and corresponding terminals. For example, a load in the form of a radio module could be arranged outside a housing of the field device for a better transmission range and connected to the energy management unit via cables. Similarly, a load in the form of a sensor element could also be arranged very close to the physical process to be measured and hence remotely from the energy management unit and connected by cable to corresponding terminals of the energy management unit.

The load 4, the capacitor 3 and the energy management unit 20 can also be combined to form a single unit, in particular a function module 40, of the field device 1. Hence, the energy management unit 20 is integrated in the module 40 together with the capacitor 3 and the load 4. The function module 40 is preferably formed as a communication module (in particular a radio module), a display, a sensor module, a measurement data processing module, a control module or a regulation module. It is preferably a module that can be retrofitted to the field device 1. Advantageously, the function module 40 can be detachably attached to a field device 1.

In this case, there may also be one or more further second current paths that can be or are each connected to a further voltage supply of the field device on the input side and in which a diode is arranged on the output side in each case, the cathode of which can be or is connected to the load 4 of the field device 1.

Figure 3:
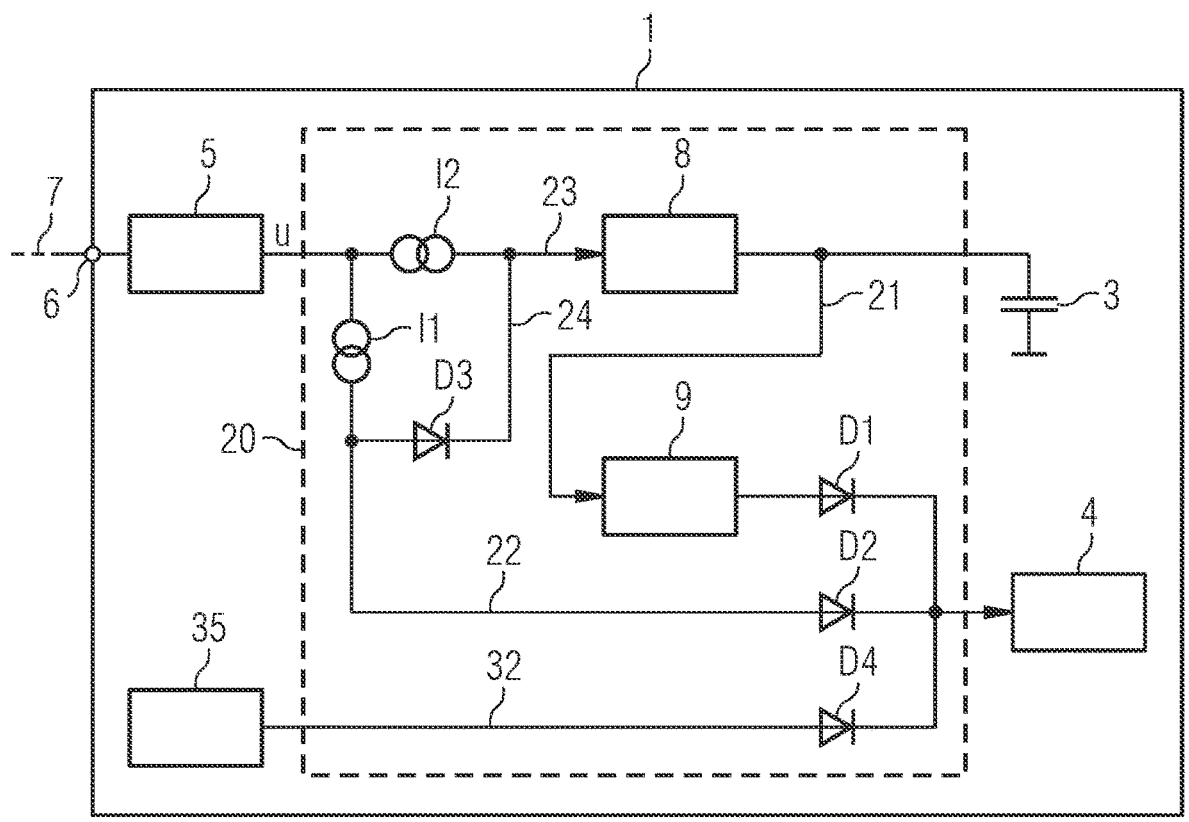
FIG. 3 is a schematic block diagram of a second exemplary embodiment of a field device with an energy management unit in accordance with the invention.

For example, as shown in FIG. 3, a further second current path 32 with a diode D4 can be connected or connectable to a further voltage supply 35 of the field device 1 on the input side in the form of a backup battery. In this way, it is still possible to switch dynamically and automatically to an emergency supply for the load in the event of failure of the externally supplied regular voltage supply 5 and a discharged capacitor 3.

As has become apparent, the energy management unit 20 enables dynamic energy management with low overheads that is, above all, energy-efficient in a field device with an energy store.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A field device energy management unit for a field device with an energy store for temporarily storing energy for a load of the field device, said temporarily stored energy for the energy requirement of the load being greater than an amount of energy supplyable by the field device, the field device energy management unit field device energy management unit comprising:

a first current path connected or connectable to the energy store on an input side, a first diode being arranged on an output side of the first current path, and a cathode of the first diode being connected or connectable to the load of the field device;

at least one second current path connected or connectable to a voltage supply of the field device on the input side, a second diode being arranged on the output side of the at least one second current path, a cathode of the second diode being connected or connectable to the load of the field device;

wherein the first and the second diodes are operable such that, when energy consumption of the load is below a lower limit, the first diode is connected in the reverse direction and the second diode is connected in the forward direction and, when the energy consumption of the load is above the an upper limit, the first diode is connected in the forward direction.

2. The energy management unit as claimed in claim 1, further comprising:

a third current path connected or connectable to the voltage supply of the field device on the input side and connected or connectable to the energy store on the output side.

3. The energy management unit as claimed in claim 2, wherein a second current-limiting element is arranged in the third current path.

4. The energy management unit as claimed in claim 3, wherein the current-limiting element comprises a current source.

5. The energy management unit as claimed in claim 2, wherein a step-up converter is arranged in the third current path.

6. The energy management unit as claimed in one of the claim 2, further comprising:

a fourth current path connecting the second current path and the third current path to one another.

7. The energy management unit as claimed in claim 6, wherein the fourth current path is connected to the second current path on the input side downstream of the first current-limiting element and to the third current path on the output side downstream of the second current-limiting element.

8. The energy management unit as claimed in claim 7, wherein a third diode is arranged in the fourth current path, an anode of the third diode being connected to the second current path and a cathode of the third diode being connected to the third current path.

9. The energy management unit as claimed in claim 6, wherein a third diode is arranged in the fourth current path, an anode of the third diode being connected to the second current path and a cathode of the third diode being connected to the third current path.

10. The energy management unit as claimed in claim 1, wherein a first current-limiting element is arranged in the second current path.

11. The energy management unit as claimed in claim 10, wherein a second current-limiting element is arranged in the third current path.

12. The energy management unit as claimed in claim 10, wherein the current-limiting element comprises a current source.

13. The energy management unit as claimed in claim 1, wherein a converter is arranged in the first current path between the energy store and the first diode.

14. The energy management unit as claimed in claim 1, wherein the energy store is configured to temporarily store energy for an energy requirement of the load which is greater than the amount supplyable by the voltage supply, said temporarily stored energy for the energy requirement of the load being greater than an amount of energy externally supplyable to the field device.

15. The energy management unit as claimed in claim 1, wherein the load is one of (i) a communication module, (ii) a display, (iii) a sensor module, (iv) a measurement data processing module, (v) a control module and (vi) a regulation module.

16. A field device with an energy store for temporarily storing energy for a load of the field device, said temporarily stored energy for the load comprising an energy requirement of the load which is greater than an amount of energy supplyable by the field device, and with the field device energy management unit as claimed in one claim 1.

17. A function module for a field device, the function module comprising:

a load;

an energy store (3) for temporarily storing energy for the load, said temporarily stored energy comprising an energy requirement of the load (4) which is greater than an amount of energy supplyable to the function module by the field device; and an energy management unit as claimed in claim 1.

18. The function module as claimed in claim 17, wherein the field device comprises one of (i) a communication module, (ii) display, (iii) sensor module, (iv) measurement data processing module, (v) control module or (vi) regulation module.

19. A method for operating the field device energy management unit as claimed in claim 1, wherein the first and the second diode are operated such that, when energy consumption is low below a predetermined lower limit, the load is only supplied with energy via the second current path and, when energy consumption is above a predetermined upper limit, is only or additionally supplied with energy via the first current path.

* * * * *